United States Patent
Chen et al.

(10) Patent No.: US 9,022,902 B2
(45) Date of Patent: May 5, 2015

(54) METHOD AND SYSTEM FOR DETERMINING CLUTCH ASSEMBLY VENT TIME FOR TRANSMISSION SHIFT CONTROL

(75) Inventors: Gang Chen, Rochester Hills, MI (US); Hussein Dourra, Bloomfield, MI (US); Marvin Correia, Troy, MI (US)

(73) Assignee: FCA US LLC, Auburn Hills, MI (US)

(*) Notice: Subject to any disclaimer, the term of this patent is extended or adjusted under 35 U.S.C. 154(b) by 583 days.

(21) Appl. No.: 13/409,569

(22) Filed: Mar. 1, 2012

(65) Prior Publication Data
US 2013/0228409 A1    Sep. 5, 2013

(51) Int. Cl.
*B60W 10/00* (2006.01)
*F16H 61/06* (2006.01)
*F16H 59/44* (2006.01)
*F16H 61/00* (2006.01)

(52) U.S. Cl.
CPC ........ *F16H 61/061* (2013.01); *F16H 2059/446* (2013.01); *F16H 2061/0087* (2013.01); *F16H 2061/062* (2013.01)

(58) Field of Classification Search
USPC ................................. 477/70, 76, 86
See application file for complete search history.

(56) References Cited

U.S. PATENT DOCUMENTS

| | | | |
|---|---|---|---|
| 4,969,098 A | | 11/1990 | Leising et al. |
| 5,168,449 A | * | 12/1992 | Benford .................. 477/146 |
| 5,547,436 A | * | 8/1996 | Hayabuchi et al. .......... 477/114 |
| 2005/0014593 A1 | | 1/2005 | Takagi |

FOREIGN PATENT DOCUMENTS

| | | |
|---|---|---|
| DE | 10051537 A1 | 4/2002 |
| DE | 10248179 A1 | 4/2004 |

OTHER PUBLICATIONS

International Search Report dated May 15, 2013 for International Application No. PCT/US2013/028253.

* cited by examiner

*Primary Examiner* — Derek D Knight
(74) *Attorney, Agent, or Firm* — Ralph E Smith

(57) ABSTRACT

A method and transmission control unit configured to improve shift event performance in a vehicle with an automatic transmission by determining a vent time for release of a clutch assembly in a transmission of a vehicle. The vehicle must be stopped and a gear selector in the vehicle must be set to a drive condition. If these conditions are met, the clutch assembly is vented. The vent time from when venting begins to when a turbine (or input shift) speed of the transmission rises is tracked. Once the turbine speed of the transmission rises, the clutch assembly is reapplied. The clutch assembly vent time is set based on the tracked vent time.

18 Claims, 4 Drawing Sheets

METHOD AND SYSTEM FOR DETERMINING CLUTCH ASSEMBLY VENT TIME FOR TRANSMISSION SHIFT CONTROL

FIELD

The technology herein relates generally to improving smoothness of shift events in an automatic transmission. More particularly, the technology herein relates to methods of learning appropriate timing for release and application of clutch assemblies during a shift event in an automatic transmission.

BACKGROUND

Smooth and efficient automatic gear shifting has long been a goal for developers of automatic transmissions. In general, this goal involves ensuring a smooth transition from a clutch that is to be released to a clutch that is to be applied when a shift event occurs. Accordingly, a gear shift event in an automatic transmission involves a release clutch and an apply clutch. For example, an up-shift event from a first gear to a second gear involves a release clutch that is coupled to the vehicle's first gear and an apply clutch that is coupled to the vehicle's second gear. During the shift event, as the release clutch is being released, the apply clutch is being applied. Ensuring appropriate timing of the release and apply clutch actions is vital to ensuring a smooth transition from the current gear to the target gear.

SUMMARY

In one form, the present disclosure provides a method of improving shift event performance in a vehicle with an automatic transmission by determining a vent time for release of a clutch assembly in the transmission of a vehicle. The method includes ensuring that the vehicle is stopped and that a gear selector in the vehicle is set to a drive condition. If these conditions are met, the clutch assembly is vented. The vent time from when venting begins to when a turbine speed of the transmission rises is tracked. Once the turbine speed of the transmission rises, the clutch assembly is reapplied. The clutch assembly vent time is set based on the tracked vent time.

In another form, the present disclosure provides a transmission in a vehicle. The transmission includes one or more clutch assemblies and a transmission control unit. The transmission control unit is configured to control the release and application of the one or more clutch assemblies during a shift event and to determine a vent time for release of a clutch assembly of the one or more clutch assemblies. This is accomplished by performing steps that include ensuring that the vehicle is stopped and that a gear selector in the vehicle is set to a drive condition. If these conditions are met, the clutch assembly is vented. The vent time from when venting begins to when a turbine speed of the transmission rises is tracked. Once the turbine speed of the transmission rises, the clutch assembly is reapplied. The clutch assembly vent time is set based on the tracked vent time.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
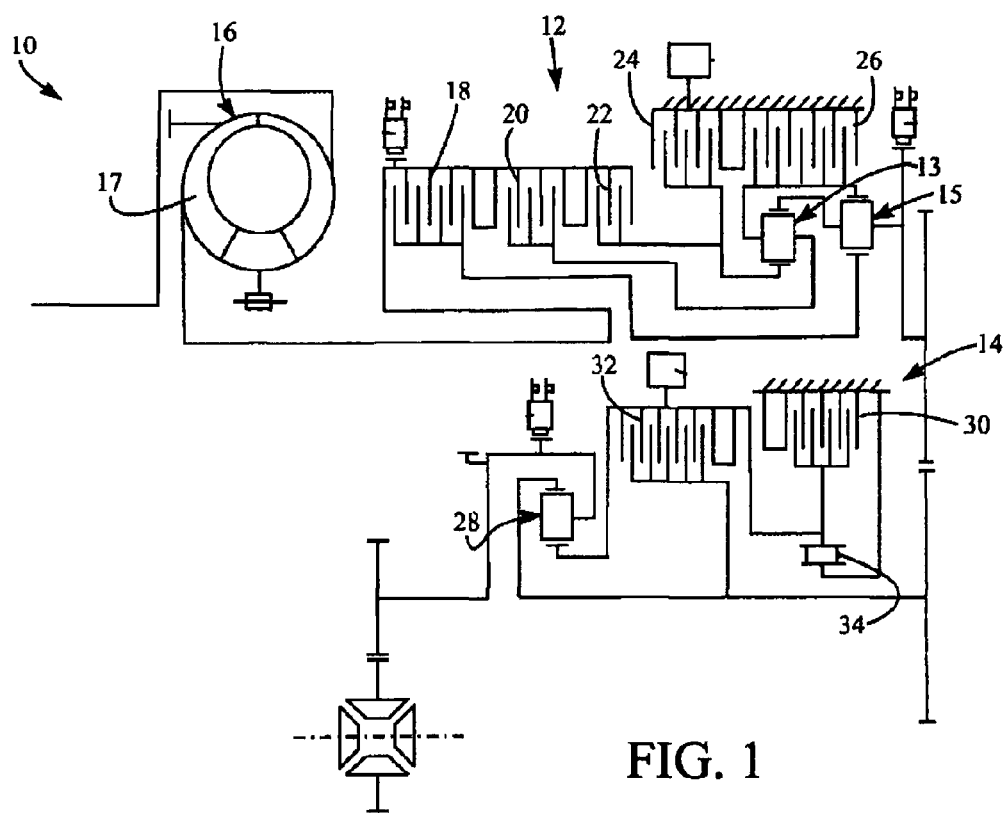
FIG. 1 illustrates a transmission assembly.

Referring in more detail to the drawings, FIG. 1 illustrates an example transmission 10 that includes a main gear box 12 and a compounder 14 arranged in series. The transmission 10 of FIG. 1 is also explained in detail in U.S. Pat. No. 7,789,798, the disclosure of which is incorporated herein by reference in its entirety. In one implementation of the transmission 10, the main gear box 12 is disposed between a torque converter 16 having a turbine diagrammatically illustrated at 17, and the compounder 14. The main gear box 12 may include gearsets 13, 15 and various friction elements, which, in one implementation, may include clutches such as an underdrive (UD) clutch 18, overdrive (OD) clutch 20, reverse clutch (R) 22, 2-4 clutch 24, and a low-reverse (L-R) clutch 26, and associated gear sets. The clutches and gearsets of the main box 12 provide a 4-speed transmission assembly that may be generally of the type set forth in U.S. Pat. No. 4,969,098, the disclosure of which is incorporated herein by reference in its entirety. The compounder 14 may include one additional gear set 28, and associated friction elements such as a LC clutch 30 and a DR clutch 32 with an over-running or freewheel clutch 34. The freewheel clutch 34 automatically releases or is not engaged when the DR clutch 32 is applied, and when the DR clutch 32 is not applied, the freewheel clutch 34 automatically engages, as is known in the art. The general construction and arrangement of the transmission 10 is set forth in U.S. Pat. No. 7,179,189, the disclosure of which is incorporated herein by reference in its entirety.

The solenoids that control application or release of the clutches preferably are, but are not limited to, pulse width modulated ("PWM") solenoids and hence, the filling and venting of fluid chambers associated with the solenoids are controlled by controlling the duty cycle of the solenoids. The instantaneous duty cycle of a given solenoid may be provided, communicated or otherwise obtained from a table, list or other source of stored data, or, as described in detail below, it may be a function of closed loop feedback control from various sensors. The duty cycle at any given time during a shift may be controlled to achieve a certain target or selected volume of fluid in the clutch, which may be related to the pressure and/or torque capacity of the clutch. Such target volume based torque phase control during an upshift is disclosed in U.S. Pat. No. 7,292,922, the disclosure of which is incorporated by reference herein in its entirety.

The element being released is vented so that the fluid pressure therein is reduced to a minimum that will support the torque hand-off to the element being applied. The apply rate for the element being applied is controlled to develop the torque needed to begin the speed change phase just as the release element net-apply-pressure reaches zero. This provides a matched exchange that reduces resistance or fight between the release and apply elements and provides a relatively smooth shift. Once the speed change begins the apply element pressure may be controlled to provide desired acceleration of a torque converter turbine.

In modern automatic transmissions, such as that illustrated in FIG. 1, various components are used to assist in smoothing the transition from one gear to another. For example, accumulators and PWM solenoid valves are used, as illustrated in FIG. 2 and described below.

Figure 2:
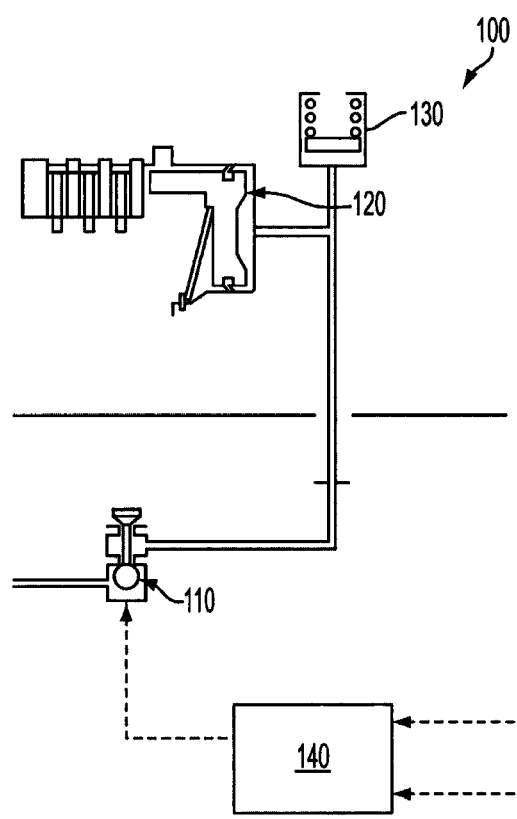
FIG. 2 illustrates a clutch assembly according to the principles of the present disclosure.

FIG. 2 illustrates a clutch assembly 100 that includes a solenoid valve 110, a clutch piston 120 and an accumulator 130. Hydraulic fluid in the clutch assembly 100 is used to exert pressure on the clutch piston 120 in order to engage or, when the pressure is decreased, disengage the clutch's respective gears. The solenoid valve 110 receives control signals from a control unit 140. The control signals instruct the solenoid valve 110 to either open or shut, thus allowing hydraulic fluid to flow into and out of the clutch assembly 100. The transmission control unit 140 outputs its control signals based on input signals received from, for example, various sensors within the vehicle's transmission. For example, and as explained below, the transmission control unit 140 may receive a signal indicating a transmission turbine speed, and may use the received signal as a parameter for the control signals output to the solenoid valve 110.

One way that the operation of the clutch assembly 100 is made smooth is by using the accumulator 130. The accumulator 130 is essentially a spring-loaded piston. When hydraulic fluid enters the clutch assembly 100, fluid is applied against both the clutch piston 120 and the piston in the accumulator 130. The accumulator 130 slows pressure buildup at the clutch piston 120 by diverting a portion of the hydraulic fluid to the accumulator piston within the same hydraulic circuit. This both delays and smooths the application of the clutch piston 120.

Another method of contributing to the smoothness of a shift event is to use the transmission control unit 140 to pulse the solenoid valve 110 on and off using PWM, thus preventing the immediate engagement of a gear and therefore making the engagement more smooth.

However, knowing when to begin and end pulsing of the solenoid valve 110 so that clutch engagement occurs at the best possible time still requires determination. Furthermore, as explained below, this proper timing is specific to each clutch assembly and is influenced by the fill volume for each clutch assembly. Additionally, the fill volume of each clutch assembly can change over time as the assembly is used due to operational wear and tear.

One strategy for determining this proper timing is to use sensed information such as the turbine speed (also referred to herein as transmission input shaft speed) of the transmission. Using sensed information such as the transmission input shaft speed, a transmission control unit can sense the clutch engagement or disengagement status or the gear-shifting positions.

Figure 3:
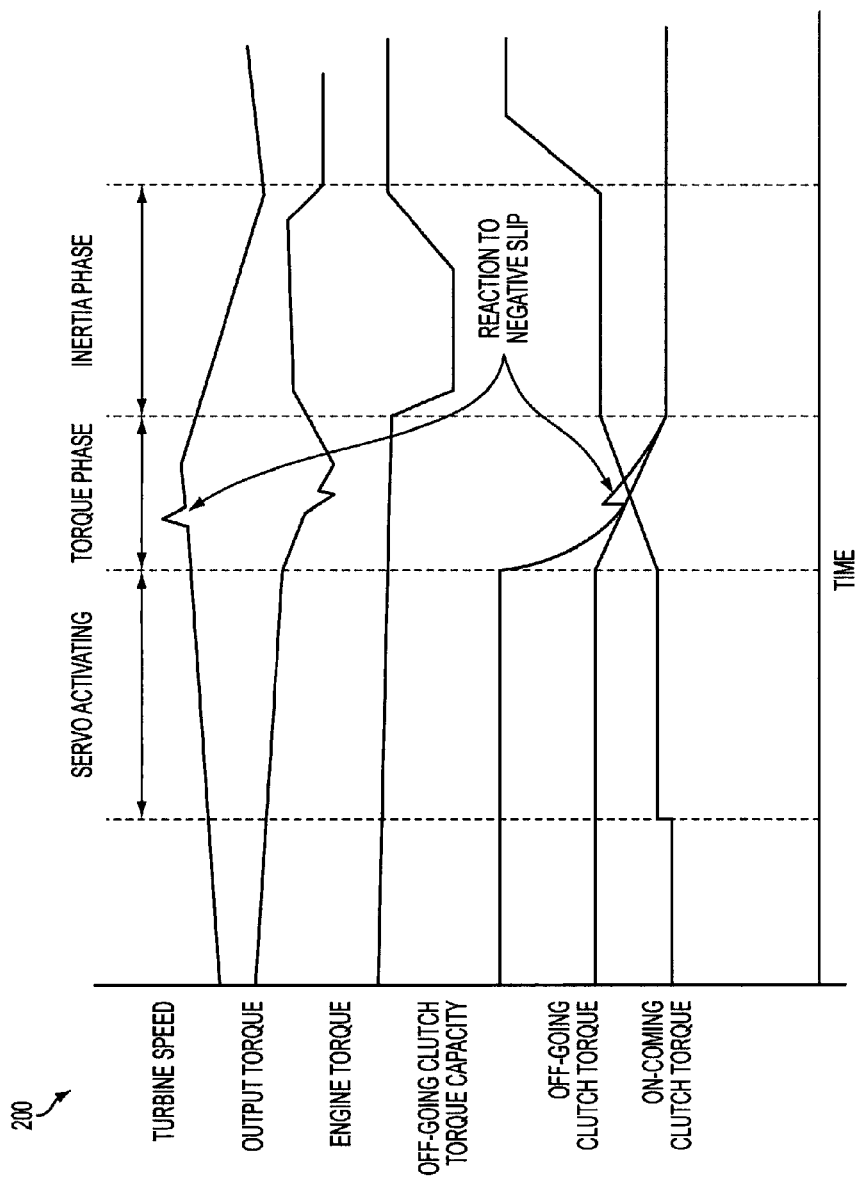
FIG. 3 illustrates a strategy for releasing and applying clutch assemblies during a shift event according to the principles of the present disclosure.

The use of a transmission's input shaft speed to govern the timing of clutch release and application is illustrated in FIG. 3. FIG. 3 shows the upper-shift timing sequence of each element. The basic idea behind the strategy illustrated in FIG. 3 is that as a release clutch releases the currently engaged gear and before an apply clutch fully engages the target gear, a degree of clutch slippage occurs. A symptom of clutch slippage is an increased revving of the vehicle's engine, also indicated as an increased transmission input shift speed. This increase in transmission input shaft speed can be sensed. The sensed increase in transmission input shaft speed can thus indicate that the release clutch is about to disengage and that the apply clutch must be simultaneously engaged.

Accordingly, FIG. 3 illustrates a strategy 200 for determining when to fully engage an apply clutch during an up-shift event. First, the transmission control unit determines that an up-shift event should occur. A number of factors may be considered by the transmission control unit, including the relative transmission input shaft speed, output torque and engine torque. Once determined, the on-coming or apply clutch is activated. This is illustrated by the step-up in on-coming clutch torque during the servo activating phase in FIG. 3.

The actual transition between the off-going clutch and the on-going clutch occurs during the torque phase of the chart in FIG. 3. During this phase, the transmission control unit begins to fill the on-coming clutch volume. The torque capacity of the on-coming clutch is gradually increased by linearly ramping up the PWM duty cycle for the on-coming clutch solenoid. This is indicated by the increase in on-coming clutch torque during the torque phase. At the same time, the transmission control unit instructs the off-going clutch to begin venting. This is indicated in the decrease seen in the off-going clutch torque and off-going clutch torque capacity during the torque phase.

At some point, the off-going clutch vents sufficiently to result in negative clutch slippage. A symptom of the clutch slippage is a spike in the transmission's input shaft speed, as illustrated in FIG. 3. A corresponding drop in output torque follows, also illustrated in FIG. 3. When the increased transmission input shaft speed is sensed, the transmission control unit causes the releasing clutch to be partially refilled in order to hold the torque until the apply clutch is able to completely take over. This is indicated by the small spike in off-going clutch torque capacity during the torque phase. Shortly, however, the on-coming clutch torque increases so as to exceed the torque provided by the off-going clutch and to fully provide sufficient output torque, as is illustrated in the torque and inertia phases in FIG. 3.

Therefore, a transmission control unit may be used to control a solenoid valve in a clutch assembly to vent the clutch assembly so as to result in a clutch release. The amount of time necessary to vent the assembly is based on the fill volume of the clutch assembly. This time can be determined by monitoring the time elapsed from the beginning of the clutch venting to when an increase in transmission input shaft speed is sensed. This time, called the clutch assembly vent time, may be set in the transmission control unit as the vent time for a given release rate (as dictated by PWM signals sent to the solenoid valve) most likely to result in a smooth gear transition during a shift event. The set vent time combined with the vent rate dictated by the PWM signals may be used to determine a clutch assembly's fill volume Traditionally, transmission control units have been designed to learn specific clutch vent times (and thus fill volumes) during actual up-shift and down-shift events during operation of the transmission's vehicle. However, because operating conditions during actual up-shift and down-shift events can vary widely, timing measurements made during up-shift and down-shift events tend to also vary widely. This is because the many transient factors present during actual driving conditions can affect the up-shift and down-shift events.

Accordingly, as disclosed herein, the transmission control unit may be configured to learn vent times and corresponding fill volumes during events other than during an up-shift or down-shift event. For example, in accordance with the present disclosure, the transmission control unit may be configured to learn clutch vent times during a time when the transmission's vehicle is not moving. These times may include, though are not limited to, when the vehicle is stopped at a red light or is otherwise stopped, but still in gear.

When the vehicle is not moving, the number of factors that affect clutch vent times is limited, and thus there is an advantage to learning clutch vent times when the vehicle is stopped. Additionally, when vehicle speed is very slow, the vehicle's transmission is very sensitive to variations in clutch vent times, and so more accurate clutch vent times may be determined. Accordingly, although the method of determining clutch vent times disclosed herein is useful for application to all shift events, it is especially useful for low-speed shifts such as, for example coast-down shifts.

Figure 4:
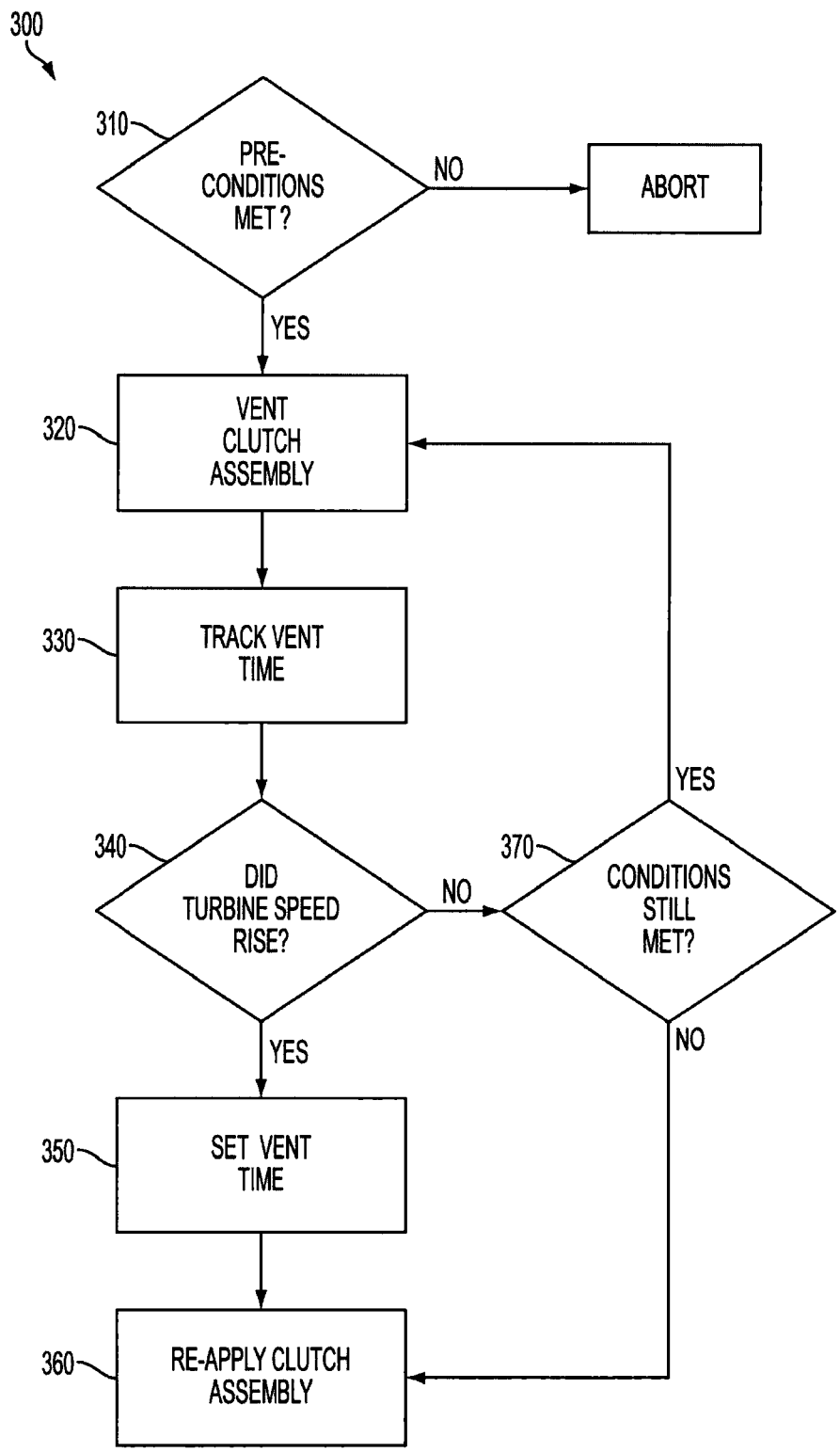
FIG. 4 illustrates a method of determining a clutch assembly vent time according to the principles of the present disclosure.

An example method 300 is illustrated in FIG. 4. Method 300 is only invoked if certain conditions are first met, as shown in step 310. These conditions essentially indicate that the vehicle is stopped, in gear and at normal operating temperatures. In order for method 300 to continue, for example, the transmission temperature TO must be greater than a calibrated value. If the transmission temperature is not sufficiently high, the method 300 aborts until a time when all necessary conditions are met.

Another necessary condition is that the vehicle is stopped. This is verified by ensuring that the vehicle's brake switch is on (the brake pedal is depressed) and that the vehicle speed NO is zero. Additionally, while the vehicle is stopped, the vehicle must also be in gear. Thus, the gear selector SLP must be set to "drive" and the transmission must be engaged in 1st gear.

Other conditions necessary for the continuation of method 300 include the vehicle's throttle THR being zero, meaning that the vehicle's gas pedal is not being depressed. In addition, the data collected by the transmission control unit need not be collected too frequently. Therefore, a limit to the frequency of data collection may be set as a condition for method 300. For example, the limit could be set so that data is collected no more than once per vehicle trip. Other preconditions could also be applied.

If all conditions are met, method 300 continues to a testing phase that occurs as long as the vehicle remains in an appropriate testing state. The test includes venting the desired clutch assembly (step 320) and tracking the vent time (step 330). As soon as the transmission's input shaft speed rises, the tracked time is identified as the appropriate vent time for the selected clutch assembly (steps 340, 350). As soon as the transmission's input shaft speed rises, the selected clutch assembly is reapplied (step 360).

During steps 320 and 330 (the venting and tracking of the selected clutch assembly), certain test conditions must continue to be met in order for the testing to continue (step 370). For example, steps 320 and 330 will be aborted if the transmission temperature TO falls under its calibrated value. Additionally steps 320 and 330 will be aborted if the brake switch shifts to the "off" state (meaning that the brake pedal is not depressed) or that the vehicle speed NO is not equal to zero. Steps 320 and 330 will be aborted if the gear selector SLP is not in the Drive state or if the transmission is not in 1st gear. Similarly, steps 320 and 330 will be aborted if the throttle THR does not equal zero.

If any of the intra-test conditions are not met during steps 320 and 330, the test is aborted and step 360 is immediately invoked.

Method 300 thus provides a method of determining a clutch vent time and corresponding fill volume that is not affected by factors present during normal driving conditions. The determined vent time for each clutch can thus be set so as to improve the timing of release and application of clutches during a shift event.

Method 300 may be applied to any specific clutch assembly. For example, the clutch assembly to be tested may include either a reverse-low ("RL") clutch assembly or an underdrive ("UD") clutch assembly. Each clutch assembly, however, must be tested separately.

What is claimed is:

1. A method of determining a vent time for release of a clutch assembly in a transmission of a vehicle, the method comprising:
   ensuring that the vehicle is stopped and that a gear selector in the vehicle is set to a drive condition;
   venting the clutch assembly;
   tracking a vent time from when venting begins to when a turbine speed of the transmission rises;
   reapplying the clutch assembly when the turbine speed of the transmission rises; and
   setting the clutch assembly vent time based on the tracked vent time;
   wherein the venting of the clutch assembly is aborted if the transmission is not in first gear.

2. The method of claim 1, wherein ensuring that the vehicle is stopped further comprises ensuring that a brake switch for the vehicle is on.

3. The method of claim 1, wherein ensuring that the vehicle is stopped further comprises ensuring that the vehicle speed is zero.

4. The method of claim 1, further comprising ensuring that the vehicle transmission is in first gear.

5. The method of claim 1, further comprising ensuring that a throttle angle of the vehicle is at zero degrees.

6. The method of claim 1, wherein setting the clutch assembly vent time only occurs a predetermined number of times for each time that the vehicle is turned on.

7. The method of claim 1, further comprising ensuring that a temperature of transmission fluid in the vehicle transmission exceeds a minimum threshold.

8. The method of claim 1, further comprising aborting the venting of the clutch assembly if the vehicle begins to move.

9. A transmission in a vehicle, comprising:
   one or more clutch assemblies; and
   a transmission control unit configured to control the release and application of the one or more clutch assemblies during a shift event, the transmission control unit further configured to determine a vent time for release of a clutch assembly of the one or more clutch assemblies by:
   ensuring that the vehicle is stopped and that a gear selector in the vehicle is set to a drive condition;
   venting the clutch assembly;
   tracking a vent time from when venting begins to when a turbine speed of the transmission rises;
   reapplying the clutch assembly when the turbine speed of the transmission rises; and
   setting the clutch assembly vent time based on the tracked vent time;
   wherein the transmission control unit is further configured to abort the venting of the clutch assembly if the vehicle begins to move.

10. The transmission of claim 9, wherein the transmission control unit is further configured to ensure that a brake switch for the vehicle is on.

11. The transmission of claim 9, wherein the transmission control unit is further configured to ensure that the vehicle speed is zero.

12. The transmission of claim 9, wherein the transmission control unit is further configured to ensure that the vehicle transmission is in first gear.

13. The transmission of claim 9, wherein the transmission control unit is further configured to ensure that a throttle angle of the vehicle is at zero degrees.

14. The transmission of claim 9, wherein the transmission control unit is further configured to ensure that a temperature of transmission fluid in the vehicle transmission exceeds a minimum threshold.

15. The transmission of claim 9, wherein the transmission control unit is further configured to abort the venting of the clutch assembly if the transmission is not in first gear.

16. A transmission in a vehicle, comprising:
one or more clutch assemblies; and
a transmission control unit configured to control the release and application of the one or more clutch assemblies during a shift event, the transmission control unit further configured to determine a vent time for release of a clutch assembly of the one or more clutch assemblies by:
ensuring that the vehicle is stopped and that a gear selector in the vehicle is set to a drive condition;
venting the clutch assembly;
tracking a vent time from when venting begins to when a turbine speed of the transmission rises;
reapplying the clutch assembly when the turbine speed of the transmission rises; and
setting the clutch assembly vent time based on the tracked vent time;
wherein the transmission control unit is further configured to ensure that setting the clutch assembly vent time only occurs a predetermined number of times for each time that the vehicle is turned on.

17. The transmission of claim 16, wherein the transmission control unit is further configured to abort the venting of the clutch assembly if the transmission is not in first gear.

18. The transmission of claim 16, wherein the transmission control unit is further configured to abort the venting of the clutch assembly if the vehicle begins to move.

* * * * *